(12) United States Patent
Oswald

(10) Patent No.: US 6,658,484 B1
(45) Date of Patent: Dec. 2, 2003

(54) MESSAGE CONTROL SYSTEM

(75) Inventor: Tom Oswald, Tigard, OR (US)

(73) Assignee: Sharp Laboratories of America, Incorporated, Camas, WA (US)

( * ) Notice: Subject to any disclaimer, the term of this patent is extended or adjusted under 35 U.S.C. 154(b) by 0 days.

(21) Appl. No.: 09/404,612

(22) Filed: Sep. 23, 1999

(51) Int. Cl.[7] .............................. G06F 9/46
(52) U.S. Cl. ..................... 709/313; 709/318
(58) Field of Search .................. 709/310–332, 709/100–108, 200–253

(56) References Cited

U.S. PATENT DOCUMENTS

| | | | | |
|---|---|---|---|---|
| 4,543,630 A | * | 9/1985 | Neches ................ | 709/252 |
| 5,018,097 A | * | 5/1991 | Kuhlmann et al. ..... | 709/313 |
| 5,485,579 A | * | 1/1996 | Hitz et al. ............. | 709/221 |
| 5,506,966 A | * | 4/1996 | Ban ..................... | 709/314 |
| 5,548,760 A | * | 8/1996 | Healey ................. | 709/314 |
| 5,590,283 A | * | 12/1996 | Hillis et al. ........... | 712/29 |
| 5,673,386 A | * | 9/1997 | Batra .................... | 714/38 |
| 5,675,736 A | * | 10/1997 | Brady et al. .......... | 709/239 |
| 5,771,385 A | * | 6/1998 | Harper ................. | 717/128 |
| 6,018,515 A | * | 1/2000 | Sorber .................. | 370/229 |
| 6,065,037 A | * | 5/2000 | Hitz et al. ............. | 709/200 |
| 6,240,067 B1 | * | 5/2001 | Sorber .................. | 370/236 |
| 6,425,002 B1 | * | 7/2002 | Zurcher et al. ........ | 709/223 |

* cited by examiner

Primary Examiner—St. John Courtenay, III
Assistant Examiner—Van Nguyen
(74) Attorney, Agent, or Firm—Marger Johnson & McCollom, PC

(57) ABSTRACT

A method for controlling messages in a software system. The method activates a report-handling module when a subroutine has a message to send. The subroutine passes an identification to the report-handling module. The subroutine then passes a message and message level to the report handling module. The report-handling module then determines the message level to be reported for that subroutine, the process from which that subroutine is sending messages and the message level to be reported for that process. If the message level of the message compares correctly to the message level of the subroutine and the process, the message is reported.

4 Claims, 1 Drawing Sheet

MESSAGE CONTROL SYSTEM

BACKGROUND OF THE INVENTION

1. Field of the Invention

This invention relates to message management in software systems, more particularly to methods for prioritizing messages in software systems.

2. Background of the Invention

Software systems require extensive testing and analysis to ensure proper operation. Testing and analysis results in messages being generated by the software system to notify the user or designer of problems or conditions of the system. A simple example of these types of messages is error messages received during the running time of a program. For example, an improper command may result in a 'runtime' error of a certain numbered condition.

However, one problem with current systems that use these messages is that there is no differentiation between messages by origin. There are no means for isolating the origin of the messages in regards to the message level. There is no interoperability with subroutines, processes and messages.

Being able to isolate the source of the message can be very helpful in analyzing systems. For example, if a large process were running, it would be helpful to be able to isolate and identify subroutines running in its context. Current systems do not provide this capability because they do not distinguish message level relating independently with process and subroutine reporting levels. Therefore, a method for control of messages on at least two levels is needed, one level for processes and one level for subroutines.

SUMMARY OF THE INVENTION

One aspect of the invention is a message control system. Subroutines running in a software system contact a report-handling module when the subroutine has a message to send. The subroutine identifies itself to the report-handling module and gives the level of the message it has. The report-handling module then determines from what process that subroutine is sending the message, the level of messages to be reported by the subroutine and the process. It then compares the message level to the subroutine and process message reporting level. If the comparison is within a defined threshold, the message is reported.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
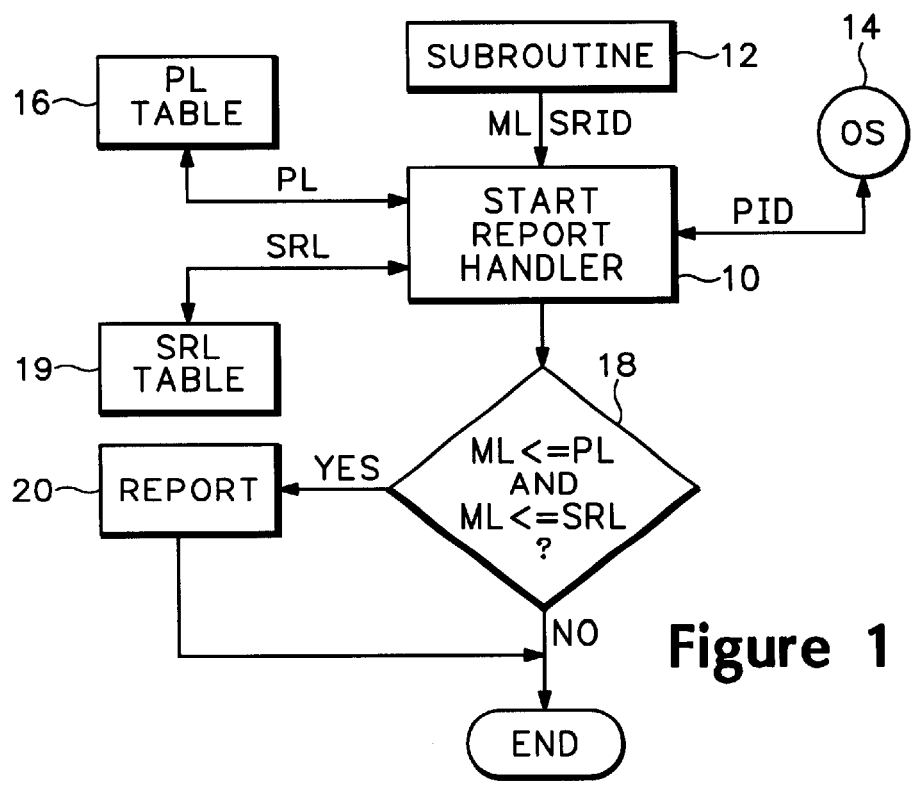
FIG. 1 shows a flowchart for one embodiment of a message control system in accordance with the invention.

FIG. 1 shows one embodiment of a system for handling messages in a software system. A report handler module 10 is contacted and activated by a subroutine 12 that has a message of a certain level (ML). As part of the contact between the subroutine 12 and the report handler 10, the subroutine would pass its identification (SRID) to the report handler. It is also possible that the subroutine could pass the message level (ML). The report handler 10 then makes contact with the operation system 14 to identify the process from which that subroutine is making contact. The report handler 10 also queries two tables to determine the message level for the process and the subroutine.

The two tables could be implemented in several ways. For example, a list of possible messages and their priorities are shown below.

| Message Type | Priority |
| --- | --- |
| Exception | 1 |
| Error | 2 |
| Warning | 3 |
| Information | 4 |
| Debug | 5 |

The above table is for either processes or subroutines. The process level table (PL) lists the various processes and their message level. The subroutine level table (SRL) lists the various subroutines and their respective message priority levels. Once the report handler 10 has acquired the process identification (PID) and the subroutine identification (SRID) it queries these two tables for the process message level (PL) and the subroutine message level (SRL).

The system developer could set these tables up manually during set up of the system. However, an executable file could be used to set up the tables with indices providing the correlation between the messages and the data. This would save the developer time and save execution time by not searching the table sequentially. The options for table set up are left up to the system designer and the above examples are merely considerations.

Returning to FIG. 1, the procedure then moves to step 18 in which these levels are compared to the incoming message level received by the report handler from the subroutine. Note that the message only contains the message information, the report handler must extract the context in which the message was sent. The report handler then compares the level of the incoming message (ML) to the process message level (PL) and the subroutine message level (SRL). If the incoming message level is of a lower level than either the process message level or the subroutine message level, the message is reported at step 20. If the message level is not a lower than either of the two message levels, no report is sent and the report handler process ends.

Note that the comparison of less than is dependent upon the manner in which the message priorities are laid out. If the ordering of severity were reversed, the message would be reported if it were of a higher level, rather than a lower level. The above example is merely for demonstrative purposes only and is in no way intended to limit the specifics of the how the comparison is performed.

In this manner, then, only messages that are above a certain predetermined priority level are reported. This allows the system designer or troubleshooter to differentiate problem sources, between processes, subroutines or subroutines under different processes. This allows the user performing the analysis to more closely track and isolate problems in the system.

One example of a situation in which it is difficult to isolate problems is in an instance of mutual exclusion, where two processes are prohibited by the system design from operating at the same time. If these two processes are using the same subroutine, it is impossible to tell which of these processes is actually running in current systems. The only message received is that the subroutine is running or has errors, with no idea of whether that subroutine had problems in one process and not in another, in current systems.

Figure 2:
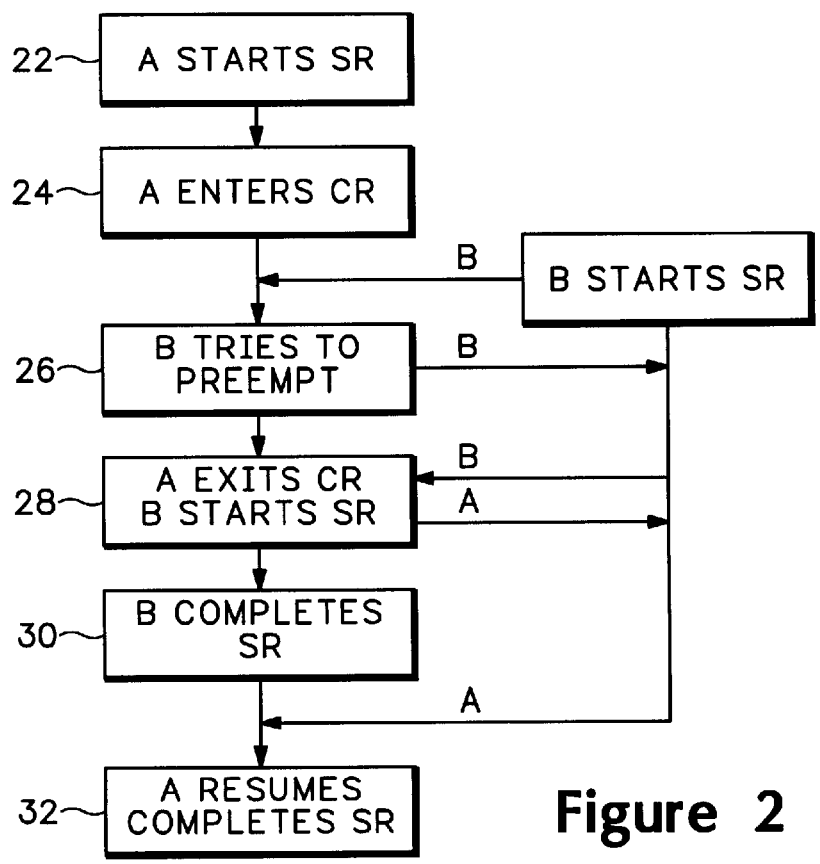
FIG. 2 shows one example of a situation in which a more robust message control system would be useful.

An example of such a situation is shown in FIG. 2. In this example, there are two processes, process A and process B. Both use a subroutine (SR). Between the two processes, B has the higher operational priority, so it is programmed to take over the processor when it is running. However, there is a critical region of the subroutine in which all operational priorities are suspended until the critical region is completed. With these parameters established, the sequence of events is shown in FIG. 2.

At step 22, process A starts the common subroutine SR. Process A enters the critical regions of the subroutine at step 24. During performance of the critical region, a semaphore is set that prevents any other processes, including those with higher operation priority, from taking the processor. At step 26, process B has tried to take the processor, but since A has set the semaphore, B is sent back to the semaphore queue.

However, at step 28, A exits the critical region of the subroutine, but is still in the subroutine itself. Since B has higher operational priority, A is suspended from the subroutine and sent to the semaphore queue as soon as it releases the semaphore and B starts to operate. Note that this happens regardless of B's relationship to the critical region of the subroutine, with respect to process A. B can now only be preempted from the processor is a third process with a higher operational priority enters the subroutine and B is not in the critical region.

Once B completes the subroutine at step 30, after it releases the semaphore. At step 32, then, A finally completes the subroutine. The above example is merely a context in which a message control system that differentiates the priorities of messages between processes and subroutines would be helpful.

For example, assume process B was set to a higher level than process A. In this example, the messaging system would report information from process B and only exceptions or errors from process A. The subroutine will probably be set to have a higher level as well. During the sequence of events described in FIG. 2, then, the system designer or trouble shooter would be able to track the preemption of the processor by B, and would only be told if there were problems with the subroutine running under process A.

In this method, the message level is not statically bound to the message. The same message can be used in different contexts without requiring creation of new messages. For example, if two drivers were being analyzed, one could have a timeout set as a warning or information, using the messaging scheme described in the table above. In the other driver, a timeout would be reported as an error. The same message, timeout, would be reported in one instance and not in the other. This saves message space and allows interoperability between message and severity.

Thus, although there has been described to this point a particular embodiment for a method and structure for a message control system, it is not intended that such specific references be considered as limitations upon the scope of this invention except in-so-far as set forth in the following claims.

What is claimed is:

1. A method for controlling messages in a software system, the method comprising:

activating a report handling module with a subroutine, wherein said subroutine passes a subroutine identification to said report handling module;

passing a message and a message level to said report handling module;

determining a subroutine level, a process identification and a process level, wherein the subroutine level, the process level and the message level are separate levels;

comparing said message level to said process level and said subroutine level; and reporting said message based upon results of said comparing step.

2. The method of claim 1 wherein passing a message and a message level further comprises passing a message and a message level wherein said message level is one of: exception; error; warning; information; or debug.

3. The method of claim 1 wherein determining further comprises using a linear table.

4. The method of claim 1 wherein determining further comprises using an executable file to track messages and indices.

* * * * *